United States Patent [19]

Leistner

[11] 4,108,543

[45] Aug. 22, 1978

[54] CAMERA FOR MOTION AND STILL PICTURES

[75] Inventor: Rudolf Leistner, Munich, Fed. Rep. of Germany

[73] Assignee: Braun AG., Kronberg Taunus, Fed. Rep. of Germany

[21] Appl. No.: 582,208

[22] Filed: May 30, 1975

Related U.S. Application Data

[63] Continuation of Ser. No. 436,160, Jan. 24, 1974, abandoned, which is a continuation of Ser. No. 11,049, Feb. 13, 1970, abandoned.

[30] Foreign Application Priority Data

Feb. 27, 1969 [LU] Luxembourg .............................. 58112

[51] Int. Cl.² ............................................. G03B 17/46
[52] U.S. Cl. .................................. 352/121; 352/137; 352/169; 352/174
[58] Field of Search ............... 352/121, 137, 169, 174, 352/176, 177, 216

[56] References Cited

U.S. PATENT DOCUMENTS

| | | | |
|---|---|---|---|
| 1,450,433 | 4/1923 | Davis | 352/217 |
| 2,462,302 | 2/1949 | Bolsey | 352/169 |
| 2,986,067 | 5/1961 | Gopfert | 352/169 |
| 3,520,598 | 7/1970 | Murata | 352/169 |
| 3,578,853 | 5/1971 | Roth | 352/141 |
| 3,602,585 | 8/1971 | Steibl | 352/216 |
| 3,603,678 | 9/1971 | Anderl | 352/169 |

FOREIGN PATENT DOCUMENTS

| | | | |
|---|---|---|---|
| 1,142,630 | 4/1957 | France | 352/169 |
| 7,870 | 6/1960 | Japan | 352/169 |

OTHER PUBLICATIONS

*Gehilfenprufung im Fotografen–Handwerk*, by Fritz Schmidt, 12th to 14th edition, pp. 122, 123.

*Primary Examiner*—Monroe H. Hayes
*Attorney, Agent, or Firm*—Ernest F. Marmorek

[57] ABSTRACT

The motion picture camera which is adjustable for taking individual pictures has a rotary shutter and means for locking this shutter in an open rest position thereof. This open rest position, at which the shutter passes the exposure light beam, is effected immediately upon the completion of the film advancement phase during one turn of the rotary shutter and can last for an arbitrarily long time period. This long time exposure is terminated by unlocking the rotary shutter simultaneously with the actuation of the release of the camera for taking the subsequent picture.

14 Claims, 10 Drawing Figures

CAMERA FOR MOTION AND STILL PICTURES

This is a continuation of application Ser. No. 436,160, filed Jan. 24, 1974, now abandoned, which was a continuation of application Ser. No. 11,049, filed Feb. 13, 1970, now abandoned.

BACKGROUND OF THE INVENTION

This invention relates generally to motion picture cameras having a rotary shutter for interrupting the exposure light beam during the advance of the film. More particularly, this invention relates to cameras having means for selecting the series or the individual picture taking operation with a predetermined or with an optional exposure time.

Reference is had to the applications of Johann Roth et al., Ser. No. 750,306, filed June 26, 1968, now U.S. Pat. No. 3,602,585; Ser. No. 779,051, filed Nov. 26, 1968, now U.S. Pat. No. 3,578,853; and Ser. No. 790,663, filed Jan. 13, 1969 now U.S. Pat. No. 3,603,678.

Known types of motion picture cameras enable the operator to expose a continuous series of pictures, namely a film scene, at a single picture frequency, or with the employment of more picture frequencies. It has also been known how to adapt the motion picture camera to take individual pictures. In either case, a rotary or a to and fro reciprocating shutter, which is driven by the film drive within the camera, covers the exposure light beam during the film advance, thus preventing the film band that is moved about one image past the film gate, from being exposed.

In the series mode of the picture taking operation, the film drive is stopped by the disengagement of the release of the camera and, simultaneously, the rotary shutter takes its closed rest position at which the exposure light beam is covered by the shutter blade.

In the individual picture taking, the shutter is positively locked in its closed rest position after the exposure of a single film image, irrespective of the length of the actuation of the release of the camera. This locked condition of the shutter after the shooting of a single picture is attained generally by mechanical means such as, for example, by a stop that is operatively associated with the release of the camera. At the actuated state of the release, the stop cooperates with a cam on the main transmission shaft of the camera. This main transmission shaft makes one rotation during the advancement phase and the exposure phase of the film.

It has been also suggested to control the stopping of the rotary shutter by electromechanical or electronic means. For example, after the exposure of one picture, an electromagnet has locked the main transmission shaft of the camera either definitely or, for the time-lapse photography, for a predetermined period of time.

In the prior art embodiments, however, there results a uniform exposure time, of about 1/30 sec. maximum, that is predetermined by the motion of the shutter. This exposure time can be shortened by the employment of the so-called adjustable rotary shutter having a continuously variable exposing sector, or by the selection of a higher picture frequency for taking pictures of rapidly moving objects. Such an exposure time in conventional cameras is suitable for the pictures where it is sufficient to determine the contours of moving objects only.

Nevertheless, it is often desirable that the film scenes taken at dawn or in the dark, and containing shots of artificially illuminated objects such as, for example, of the night traffic in streets of a metropolis, or pictures of a people's feast, be combined or interlaced with pictures of eminent buildings, squares or streets at that area. Such a desired combination is usually obstructed due to the insufficient illumination that in most cases makes it impossible to take motion pictures that would reproduce all substantial details, even if powerful light-transmitting lenses are employed.

BRIEF SUMMARY OF THE INVENTION

Accordingly, it is an object of this invention to provide a motion picture camera that makes it possible to shoot pictures of motionless or extremely slowly moving objects at an illumination that is normally insufficient for film exposures.

Another object of the invention is to provide means in motion picture cameras for the taking of series or individual exposures with arbitrarily long exposure times.

Still another object of this invention is to provide means for an automatic, successive picture taking with an arbitrarily selected exposure time.

In the motion picture camera for the series or individual mode of operation according to this invention, the above objects are attained by associating the camera with a device which enables to expose the film image for an arbitrarily long period of time. This device keeps the rotary shutter of the camera in a rest open position for the period following the completion of the film advance phase and lasting until a subsequent film advance phase is released.

For shooting film images with arbitrarily long exposures, as a long time exposure, it is necessary to set a control member on the camera for this mode of operation and, when the film is to be advanced about one image, to engage the release of the camera. In the series mode of the picture taking operation, the time interval for this advancement phase corresponds to a definite period during which the rotary shutter covers the exposure light beam. Immediately on the completion of the film advance, however, the shutter is reopened and, according to this invention, it remains in that open position irrespective of the operated or inoperated condition of the release of the camera. Only after the disengagement and reactuation of the release of the camera, is a subsequent advancement phase of the film about one image initiated. The time for a long time exposure is determined in a conventional manner, preferably by means of an exposure meter. In the camera according to the invention, the long time exposure corresponds exclusively to the time interval between two successive actuations of the release of the camera.

Due to the fact that in the present camera the long time exposure is terminated by a single actuation of the camera release and, after the advance of the film about one image, the following long time exposure is immediately initiated, it is advantageous to associate with the camera an electromechanically or electronically operating pulse generator. This pulse generator will periodically actuate the release of the camera to replace the manipulation by the photographer, and it will control the advance of the film band in the camera in accordance with the selected time intervals corresponding to the measured exposure time for the long duration exposures.

By this means it is insured that without any cooperation from the photographer, a continual series of long time exposures with uniform exposure times can be correctly interlaced.

The camera according to this invention is suitable not only for the shooting of pictures of buildings illuminated by artificial light, but also for the photography of extremely slowly moving objects, such as of slowly creeping animals, or of mollusks, for example, under such light conditions which normally would not suffice for a film picture. As is known, the application of a powerful light source for pictures of this kind is undesired since, especially for the photography of animals, such an intense light is extremely disturbing, or even obstructive.

The camera of this invention can also be employed for scientific purposes. By means of an electric flash it renders possible the taking of pictures of objects moving or being moved in a dark space at different speeds. The picture can thus be taken at a moment when the photographed object has attained a preselected, usually uniform distance during its travel. The electric flash is advantageously released by the moving object itself as soon as the latter has attained the predetermined space interval, and the film image is thus exposed through the open rotary shutter of the camera. Equally successfully there can be taken pictures of sparks in a spark gap. The extinguishing of the electric flash or of a spark can be monitored by means of a photoelectric transducer. The signal generated by this transducer is applied to a pulse generator which causes the advance of the film band about one image. Thereupon, the rotary shutter is immediately reopened in order to expose the advanced film image.

The device associated with the motion picture camera to enable the exposure for an arbitrarily long time, comprises preferably a locking member which is coupled with the release of the camera to be actuated simultaneously therewith, and which determines two different rest positions of the rotary shutter.

For the normal operation of the motion picture camera or for taking individual pictures with an exposure time that is predetermined by the movement of the rotary shutter, the locking member locks the rotary shutter in its covering condition.

In the second rest position of the shutter, the latter is locked in its open condition in order to make long time exposures defined by the time interval between the end of a film advancement and the beginning of a subsequent film advance phase.

By means of this invention it is possible to adjust at relatively minimum costs the motion picture cameras having a rotary or a to and fro reciprocating shutter, for the long time exposures.

If the motion picture camera has the so-called adjustable rotary shutter for covering the exposure light beam during the advancement phase of the film, then the aforementioned device for the exposure of the film for an arbitrarily long period controls the mutual position of the two blades of the rotary shutter.

In the normal series or individual picture taking operation of the camera when the exposure time is the function of the motion of the shutter, this adjustment of the two shutter blades is effected during the covering rest position when the exposure light beam is interrupted. At the setting of the camera for long time exposures, the adjustable blade of the rotary shutter is moved against the directly driven blade in such a way that the latter, during the time interval between the end of one film advancing phase and the initiation of the following one, allows the exposure light beam to pass through the film gate. In the above described modification of the rotary shutter, two different locking means for the open and the covering positions of the rotary shutter become unnecessary, since it is possible to set the adjustable rotary shutter to a position that enables the making of the long time exposures.

BRIEF DESCRIPTION OF SEVERAL VIEWS OF THE DRAWING

For a better understanding of the invention, reference is had to the accompanying drawing, in which.

DETAILED DESCRIPTION

Figure 1:
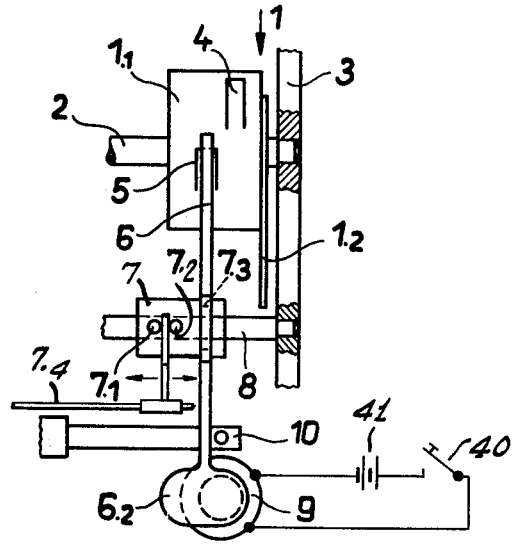
FIG. 1 is a schematic side elevational view, partly in section, of a device according to this invention for making long time exposures with a motion picture camera having a rotary shutter with a film shutter blade.
Figure 2:
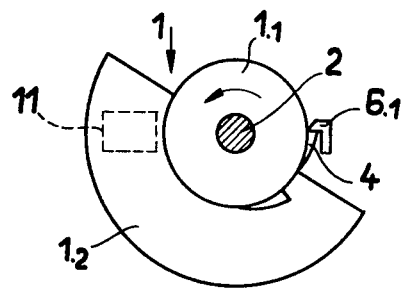
FIG. 2 is a front elevational view, partly in section, of the rotary shutter of FIG. 1 in its covering position.
Figure 3:
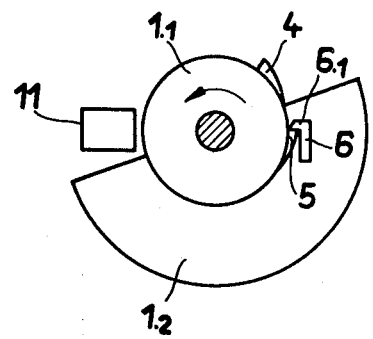
FIG. 3 is a front elevational view, partly in section, of the rotary shutter of FIG. 1 in its position for long time exposures.

FIGS. 1 to 3 illustrate an embodiment of the device for making arbitrarily extendable exposures in cooperation with a rotary shutter which has a single firm blade for covering the exposure light beam during the film advancement phase. The rotary shutter 1 comprises a drum-like rotary body 1.1 upon which a single shutter blade 1.2 is fixedly secured in a radial direction. The shutter 1 is seated on the main transmission shaft 2 of the camera. As shown in the fragmentary sectional view of FIG. 1, the right hand portion of the main transmission shaft 2 is journalled at the wall of the housing 3. This transmission shaft 2 also supports in a conventional manner control cams for the film advancing mechanism, and it is driven from a driving motor over an interposed reduction gear (not shown) about one rotation for every film image advancement.

The drum-like rotary body 1.1 of the shutter 1 is provided on its cylindrical surface with two wedge-shaped locking cams 4 and 5 which are spaced apart one from the other, both in the axial direction and in the direction of rotation. The inclined surfaces of the cams 4 and 5 ascend in the direction of rotation and are terminated with radial locking surfaces. A stop lever 6 cooperates with the selected one of the cams 4 and 5, and in the embodiment as shown in FIG. 1, it is in the form of a two-armed lever which is pivotally supported in an annular groove 7.3 of a sleeve 7. This sleeve 7 is slidably mounted on an axle 8 that is fixedly secured to the walls of the housing 3 and extends parallel with the main transmission shaft 2. The periphery of the sleeve 7 is further provided with a bifurcated coupling means having two radially projecting pins 7.1 and 7.2 adapted for engagement with a jaw-shaped coupling portion of a control handle 7.4. By this coupling means, the sleeve 7 with the stop lever 6 can be slidably moved on the axle 8 in order to place the upper arm of the lever 6 into the region either of the cam 4 or of the cam 5. The lower arm of the stop lever 6 is at the end thereof provided with an armature 6.2 which can be operated by the core of an electromagnet 9 at any axial position of the stop lever 6.

In the range of travel of the lower arm of the stop lever 6 there is situated a leaf spring switch 10 with two contacts operable for controlling a driving circuit of the camera. The upper contact is spring loaded and forces the stop lever 6 against the locking cams 4 and 5. When a camera release 40 is closed and the stop lever 6 is operated by the electromagnet 9, the switch 10 is simultaneously turned on and closes the electrical driving circuit for the camera.

At the rest condition, that is at the condition of the motion picture camera at which no film feeding takes place, the rotary shutter 1 is normally in a covering rest position, as shown in FIG. 2. At that covering rest position, an arresting hook 6.1 which is formed at the end of the upper arm of the stop lever 6, engages with the radial stop face of the locking cam 4. For this aim, the stop lever 6 must be moved from the left side position, as shown in FIG. 1 to its right side position on the axle 8. The positions of the film gate 11, of the shutter blade 1.2 and of the cam 4 are interadjusted in such a way that during the covering rest position the shutter blade 1.2 completely covers the film gate 11 and prevents the film band from the exposure.

If the camera is to be set into operation, the electromagnet 9 is first energized simultaneously with the actuation of the release of the camera. The activated electromagnet 9 operates the armature 6.2 disposed at the end of the lower arm of the stop lever 6 and makes the latter swing clockwise about the axle 8. The arresting hook 6.1 is thus disengaged from the radial stop face of the locking cam 4. At the same time, the stop lever 6 during its swinging motion turns on the switch 10 and closes the driving motor circuit of the camera (not shown). The driving motor through a suitable reduction gear starts driving the main transmission shaft. As mentioned before, the main transmission shaft 2 supports, in addition to the rotary shutter 1, conventional control cams (not illustrated) for controlling the film advancing mechanism. This film advancing mechanism operates in a known manner to advance the film band within the motion picture camera always about one image field during the coverage of the film gate 11 by the blade 1.2 of the rotary shutter 1.

For taking series (continuously successive) pictures with a predetermined exposure time, the energizing circuit for the electromagnet 9 remains closed until the camera release becomes disengaged. On the other hand, if the operation controls of the motion picture camera are set for taking individual exposures with a predetermined exposure time, the electromagnet 9 is only temporarily activated and it must be at any rate disconnected (deenergized) before the completion of one rotation of the main transmission shaft 2. This momentary activation of the electromagnet 9 can be accomplished by electromechanical means, for instance, which turn off the power supply circuit of the electromagnet during a single rotation of the transmission shaft 2 and keep this circuit open until the camera release is reactuated.

In another variation, it is also possible to employ an electronic switch for turning on the power supply circuit of the electromagnet 9. The electronic switch may be of any suitable construction for controlling automatically the actuation of the electromagnet 9 during a predetermined angular displacement of the main transmission shaft 2, as it may be desired for a selected mode of the operation of the camera. For the individual picture taking, of course, the stop lever 6 must be locked before the end of one rotation of the main transmission shaft 2 and of the rotary shutter 1, namely it must be brought into the position where the arresting hook 6.1 is engaged with the radial stop face of the locking cam 4 on the periphery of the rotary body 1.1, thereby stopping the rotation of the shutter 1 in its rest covering position.

To make long time exposures, the operation controls of the camera must be set for the individual picture taking operation by displacing the sleeve 7 by means of a fork-shaped coupling lever 7.4 to the left side position on the axle 8, as shown in FIG. 1. In that long time exposure position, the stop lever 6 cooperates with the cam 5 on the periphery of the rotary shutter 1. Upon the actuation of the release of the camera, the armature 6.2 at the bottom end of the stop lever 6 is operated by the electromagnet 9. Consequently, the switch 10 becomes turned on, the motor driving circuit is closed and the main transmission shaft 2 together with the rotary shutter 1 start rotating. In the same manner as in the previous individual picture taking operation with a predetermined exposure time, the previously described control means interrupts, prior to the completion of one turn of the main transmission shaft 2, the power supply circuit for the electromagnet 9. As a consequence, the stop lever 6 takes its locked position at which the arresting hook 6.1 engages with the radial stop face of the locking cam 5, and stops the motion of the rotary shutter 1. During the partial rotation of the shutter 1, the arresting hook 6.1 slidably follows the periphery of the rotary body 1.1. The angular position of the locking cam 5 on the rotary shutter body 1.1 is adjusted in such a manner as to leave the film gate 11 uncovered by the shutter blade 1.2 during the rest condition of the shutter 1 (FIG. 3). The rotary shutter 1 now remains in this open rest position as long as the release of the camera is both disengaged and reactuated. Only upon the reactuation of the release, the energizing circuit for the electromagnet 9 becomes closed, the armature 6.2 is operated by the electromagnet 9, the arresting hook 6.1 of the stop lever 6 is disengaged from the stop face of the locking cam 5, and the rotary shutter 1 with the main transmission shaft 2 are released to make further rotation. At the same time, the shutter blade 1.2 covers during the entire film advancing phase the film gate 11 of the camera. After the completion of this phase, the rotary shutter 1 is locked again in its open rest position.

To change the long time exposure position for a normal operational position with a single predetermined exposure time, the sleeve 7 is pushed, by the aid of a coupling lever and coupling pins 7.1 and 7.2, to the right, and the stop lever 6 is thus replaced against the right hand locking cam 4 which insures the covering rest position of the rotary shutter 1. As explained before, the arresting hook 6.1 locks the rotary shutter 1 after the completion of the film advancing phase.

It is also within the scope of this invention to modify control means for the long time exposures in such a way as to substitute the manual control of the activation of the electromagnet 9 by an automatic electromechanical or electronic device. This automatic control device can be a trigger pulse generator which generates at optional time intervals the driving pulses for the electromagnet 9 and thereby advances automatically the film band inside the camera about one image after the end of every long time exposure.

Another embodiment of the device according to this invention for long time exposures in motion picture cameras having an adjustable rotary shutter, is shown in FIGS. 4 to 10.

Figure 4:
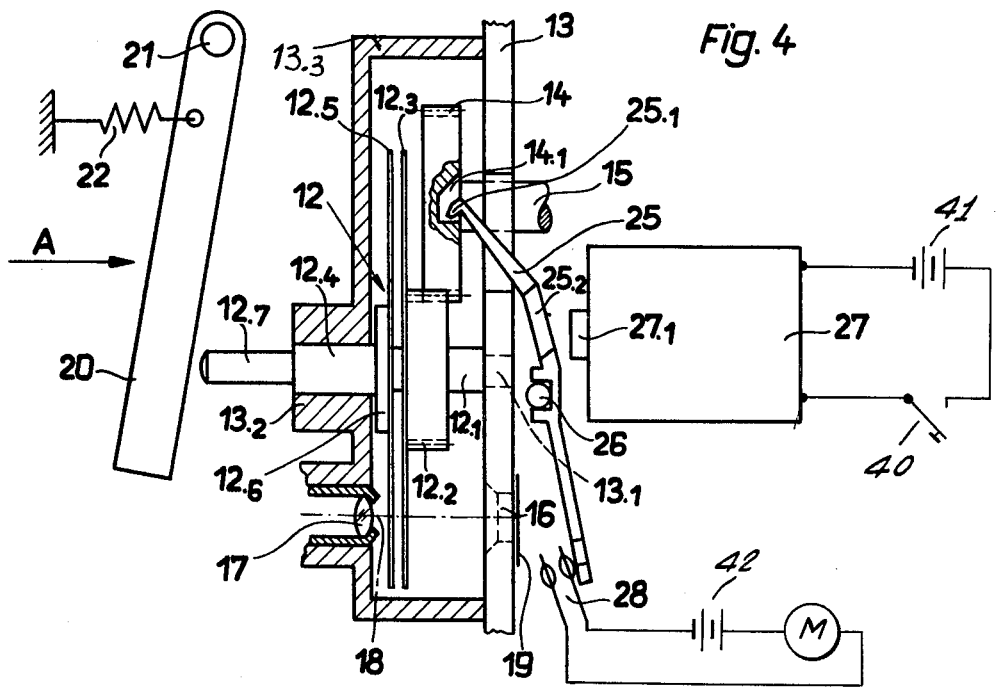
FIG. 4 is a schematic fragmentary side elevational view, partly in section, of a modification of the device for long time exposures in a motion picture camera with an adjustable rotary shutter.

The adjustable rotary shutter 12 as shown in FIG. 4 is seated on a hollow shutter hub 12.1, the reduced end portion 13.1 thereof being journalled for rotation in the wall of a partition 13 inside the camera. A gear 12.2 is fixedly supported on the rotatable hub 12.1 and is in engagement with another gear 14. The gear 14 is situated on and driven by the main transmission shaft 15 of the camera. The main transmission shaft 15 performs one rotation per one film advancement and supports in a known manner control cams of a film advancing mechanism (not shown). These control cams are coordinated with the blades of the adjustable rotary shutter 12 in such a manner as to prevent the exposure light beam 18, incoming from the objective lens 17, from entering the film gate 16 during the film advancement phase and thus from exposing the film during this period.

The directly driven shutter blade 12.3 is firmly secured to the wall of the gear 12.2 that is disposed on the rotatable hub 12.1 and is, therefore, directly rotated therewith. The left hand portion of the hollow hub 12.1 is adjustably supported in a sleeve 12.4 which, in turn, is rotatably seated in a bearing socket 13.2 in the wall of a container-shaped chassis 13.3 attached to the partition 13. The end of the sleeve 12.4 that projects into the chassis 13.3 is integral with a flange 12.6 which supports the adjustable shutter blade 12.5. The sleeve 12.4 and thus the adjustable shutter blade 12.5 are angularly displaceable with regard to the hub 12.1 about a predetermined angle such as, for example, of 220°.

The inner wall of the sleeve 12.4 is provided with a suitable helical groove that is in engagement with a radially projecting follower pin at one end of a thrust bolt 12.7. The thrust bolt 12.7 is movably guided in axial direction through the hollow shutter hub 12.1 and is held in its initial position, as shown in FIG. 4, by means of a tension spring which is also disposed within the hollow hub 12.1 as shown in greater detail in FIG. 1 of the aforementioned U.S. Pat. No. 3,602,585. In this initial position the follower pin is spring loaded against the left hand end of the helical groove.

Figure 5:
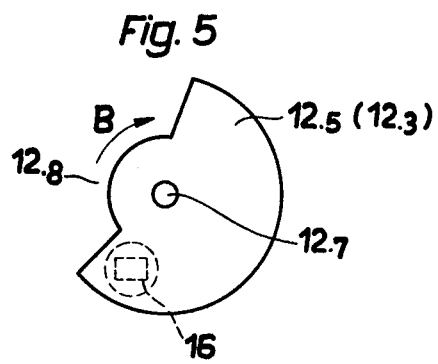
FIG. 5 is a front elevational view of the adjustable rotary shutter of FIG. 4 in its covering rest position.
Figure 6:
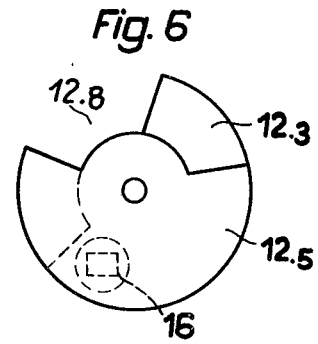
FIG. 6 is a front elevational view showing the rotary shutter of FIG. 5 in a position with a half-open exposure sector.
Figure 7:
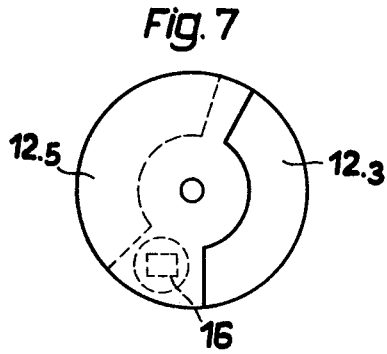
FIG. 7 is a front elevational view of the rotary shutter of FIG. 5 in a position with overlapping shutter blades.
Figure 9:
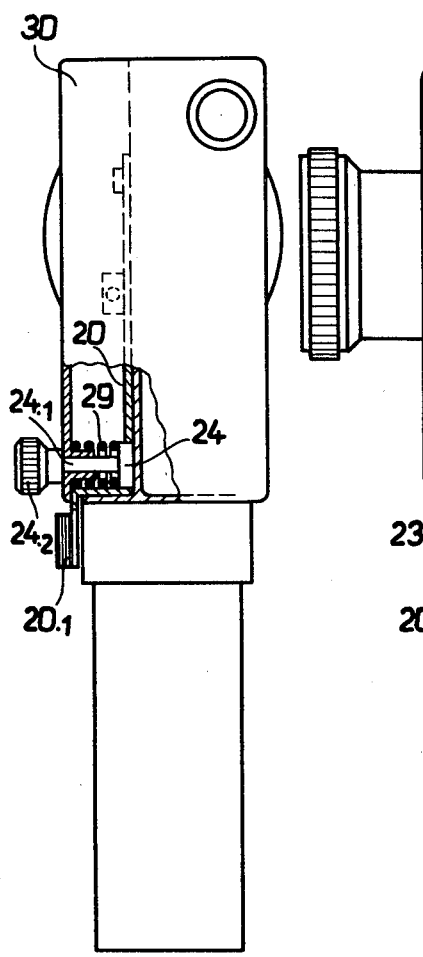
FIG. 9 is a cutaway rear elevational view, partly in section, of a motion picture camera with a control handle and a control pull knob for selecting positions of the adjustable rotary shutter.
Figure 10:
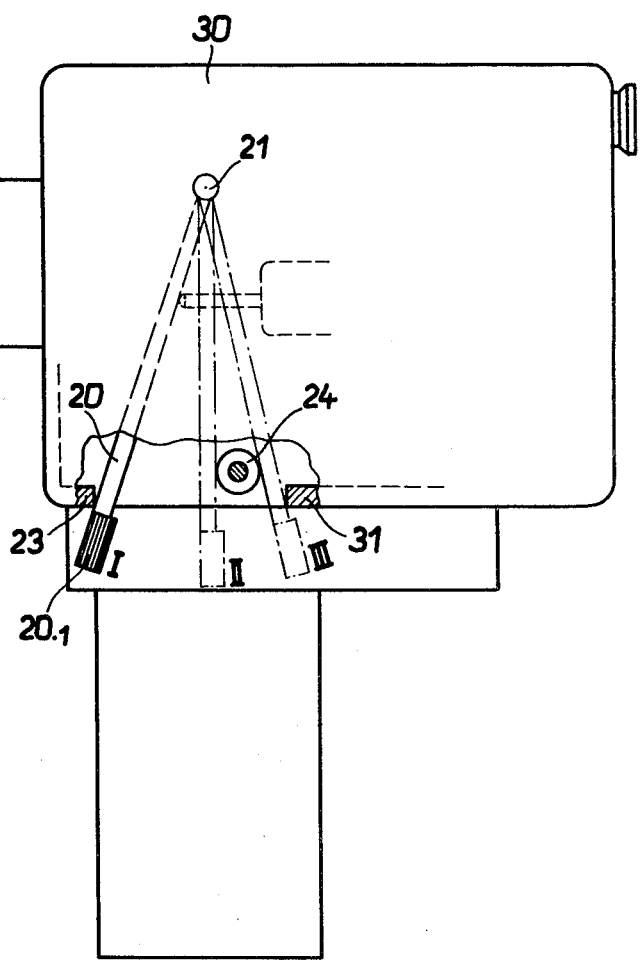
FIG. 10 is a cutaway side elevational view, partly in section, of the camera of FIG. 9.

The above described arrangement of the thrust bolt 12.7 serves for the adjustment of the covering or of the open position of the adjustable rotary shutter 12. An adjusting lever 20 that is swingably supported on a pivot 21, cooperates with the open end of the thrust bolt 12.7. The swingable end of the lever 20 protrudes through a slot in the camera housing and is provided with a control handle 20.1 (FIG. 9). The adjusting lever 20 is spring loaded to rest against one end stop 23 in the slot in the camera housing (FIG. 10). In this initial rest position, which is designated by I in FIG. 10, the adjusting lever 20 is out of engagement with the thrust bolt 12.7 and, as a result, the adjustable rotary shutter 12 is in its extreme wide open condition. More particularly, the thrust bolt 12.7 which, due to the force of the tension spring within the hollow hub 12.1 is moved to its projecting rest position (FIG. 4), causes the sleeve 12.4 to be angularly displaced by the action of the helical groove and the follower pin, and the shutter blade 12.5 is thereby adjusted into alignment with the directly driven shutter blade 12.3, as illustrated in FIG. 5. Consequently, as mentioned above, the rotary shutter 12 is set for the maximum opening of the exposure sector 12.8. If the rotary shutter 12 is to be continuously adjusted from its wide open position to its closed position in order to darken a film scene, for example, the adjusting lever 20 is then slowly moved counterclockwise against the thrust bolt 12.7. By this action, the thrust bolt 12.7 is guided into the interior of the hollow hub 12.1 in the direction of the arrow A, the follower pin causes through the helical groove a continuous angular displacement of the sleeve 12.4, and the angular position of the adjustable blade 12.5 is thus continuously changed with respect to the directly driven shutter blade 12.3. Accordingly, the exposure sector 12.8 is continuously reduced in the direction of the arrow B (FIGS. 5 and 6). Finally, as soon as the adjusting lever 20 abuts a removable stop disk 24 at the position II in FIG. 10, the adjustable shutter blade 12.5 will cover the entire area of the exposure sector 12.8 of the directly driven shutter blade 12.3 (FIG. 7). At the position II, a dimming condition of the camera operation is attained at which the exposure light beam is interrupted in any angle of rotation of the adjustable rotary shutter 12.

As soon as the handle 20.1 of the adjusting lever 20 is disengaged, the latter is returned by the effect of the restoring spring 22 into its initial position in abutment with the stop 23. Similarly, the thrust bolt 12.7 is also returned by the action of the tension spring inside the hollow hub 12.1 to its projecting rest position (FIG. 4), and the exposure sector 12.8 is in its wide open position again. This continuous opening or closing of the exposure sector 12.8 of the adjustable shutter 12, namely the so-called fading and dimming, can be easily controlled manually by moving the control handle 20.1 between the positions I and II. The structure of the above described adjustable shutter corresponds basically to that as described in the U.S. Pat. No. 3,602,585.

In any of the mutually angular positions of the shutter blades 12.3 and 12.5, as shown in FIGS. 5 to 7, the adjustable rotary shutter is returned to its closed rest position at which the adjustable shutter blade 12.5 covers the film gate 16 of the camera to prevent the film portion in the film gate from being exposed. This closed rest position of the shutter 12 is controlled by a two-arm stop lever 25 (FIG. 4) which is provided at the top of its upper arm with an arresting hook 25.1 in order to engage with a recess 14.1 in the side wall of the gear 14 and to lock the latter when actuated.

The stop lever 25 is pivotally supported on a bearing bolt 26. A central portion of its upper arm is enlarged into an armature 25.2 that cooperates with an electromagnet 27. This electromagnet 27 is kept energized either during the entire period of actuation of the release of the camera (at the series picture shooting), or for the period of a single turn of the rotary shutter 12 (at the taking of individual pictures or at long time exposures).

By the activation of the electromagnet 27 the stop lever 25 is operated by the magnet core 27.1 and the arresting hook 25.1 is disengaged from the recess 14.1 in the driving gear 14. As a result, the main transmission shaft 15 is unlocked either for the duration of the entire film scene or for the time intervals of individual pictures. Simultaneously, the lower arm of the stop lever 25 turns on a switch 28 in the power supply circuit of the motor of the camera and puts this driving motor into operation.

Figure 8:
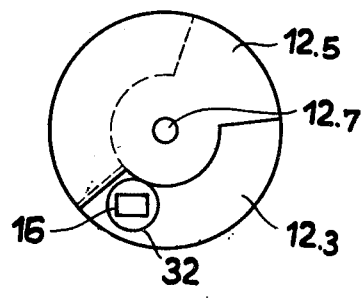
FIG. 8 is a front elevational view of the rotary shutter of FIG. 5 in the position for long time exposures according to this invention.

For the making of long time exposures, the adjusting lever 20 is adjusted into the position III, as shown in FIG. 10. To maintain the lever 20 in this extreme position, the stop disk 24 is removably arranged in the path of movement of the swingable lever 20 and is controlled by a pull knob 24.2. The control pull knob 24.2 is connected to the stop disk 24 by means of a bolt 24.1 that projects through the housing 30 of the camera. The retractable stop disk 24 is returned to its rest position by a restoring spring 29. Upon the adjustment of the lever 20 into the position for making the long time exposures (position III in FIG. 10), the pull knob 24.2 is released and the stop disk 24 is returned by the spring 29 to its rest position against the wall of a partition within the camera. In the latter position, the adjusting lever 20 is locked between the limit stop 31 in the housing 30 and the stop disk 24. The thrust bolt 12.7 is thereby displaced to and locked in its extreme right hand position. Consequently, the adjustable shutter blade 12.5 is further angularly displaced in the direction of the arrow B from its fully covering position with regard to the shutter blade 12.3 (FIG. 7) into the position at which an aperture 32 in the directly driven shutter blade 12.3 is uncovered (FIG. 8). The aperture 32 is provided at such a location on the shutter blade 12.3 as to coincide at the rest position of the rotary shutter 12 with the film gate 16 of the camera.

As a result, the exposure light beam 18 can freely pass through the aperture 32 to expose the film image in the film gate 16 during the rest condition of the adjustable rotary shutter 12. The shutter 12 remains in the rest position according to FIG. 8 as long as the release of the camera is disengaged and reactuated. At the same time, the stop lever 25 which is momentarily operated by the momentarily activated electromagnet 29, unlocks for one turn the main transmission shaft 15 with the associated shutter 12. Even at the aforedescribed adjustment of the camera operation, every actuation of the release of the camera causes the film band in the camera to be advanced about one image during the coverage of the aperture 16. Subsequently, the rotary shutter 12 is kept in its open position, as illustrated in FIG. 8, for a desired time interval which is ascertained preferably by measurement. In the meantime, the release of the camera has been disengaged. In order to stop the long time exposure, the release must be actuated again.

Due to the fact that by the reactuation of the release of the camera a new long time exposure is initiated immediately after the advancement of the film image, it is advantageous and within the scope of the present invention to equip the camera with an automatic trigger pulse generator such as illustrated in FIGS. 2 and 3 of the aforementioned U.S. Pat. No. 3,603,678 for instance which activates the electromagnet 27 either electromechanically or electronically, thereby replacing the manipulation by the photographer. For this purpose the trigger pulse generator must produce pulses in controllable time intervals corresponding to the predetermined or measured exposure durations. The film band is thereby automatically advanced after the end of every long time exposure. To finish the long time exposures, the locking disk 24 is removed by means of the pull knob 24.2, and the adjusting lever 20 returns to its rest position at which the adjustable shutter blade 12.5 covers the exposure aperture 32 in the directly driven shutter blade 12.3.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A motion picture camera for taking series and individual pictures with film, comprising, in combination:

a housing, an aperture defined in said housing operable for passing light; said film being so positioned in said housing that a portion thereof is aligned with said aperture for exposing said portion to light;

film advancement means operable for advancing said film to a position wherein another portion will be aligned with said aperture;

moveable shutter means having closed and open positions for blocking and, respectively, unblocking the passage of light through said aperture;

moving means for moving said shutter means between the open and closed positions;

shutter control means operable for arresting said shutter means in its open position; and primary control means connected to said shutter means, to said film advancement means, and to said shutter control means for operating on a single activation first to activate said moving means to move said shutter means to its closed position, then to activate said film advancement means to advance said film, subsequently to activate said moving means to move said shutter means to its open position, and thereafter to activate said shutter control means to arrest said shutter means in its open position.

2. The motion picture camera according to claim 1, wherein said shutter means is rotatably mounted and said shutter control means comprises two locking cams disposed on said shutter means; said locking cams being spaced apart from one another in the axial direction and in the direction of rotation of said shutter means; a movable arresting member arranged for selective engagement with said locking cams; said aperture, said shutter means and said shutter control means being interadjusted to pass light through said aperture when said arresting member is set for engagement with one of said locking cams and to interrupt the light when said arresting member is set for engagement with the other locking cam.

3. The motion picture camera according to claim 1, wherein said shutter means comprises an adjustable rotary members having a directly driven shutter blade cooperating with an angularly adjustable shutter blade for providing a controllable exposure sector therebetween, further comprising means for arresting said adjustable rotary member at a rest closed position thereof immediately after the film image advancement for selectively taking the series and the individual pictures at an exposure time that is predetermined by the rotation of said rotary member, and means for arresting said adjustable rotary member at an open rest position thereof for making arbitrarily long exposures during the time interval between the end of a film advancement and the activation of said primary control means.

4. The motion picture camera according to claim 1, further comprising adjustable electronic trigger pulse means operable to activate said primary control means at preselected time intervals.

5. The motion picture camera according to claim 2, wherein said arresting means is a two-arm lever, said lever being movably supported on an axle parallel to the axis of said shutter means and spring loaded to come into engagement with said one locking cam when said primary control means is in its inactivated condition.

6. The motion picture camera according to claim 5, further comprising a mechanical coupling member connected to said movable two-arm lever and projecting through said housing to control the movement of said lever in the direction of said axle, and electromechanical control means for controlling the locking pivotal of said lever simultaneously with the activation of said primary control means.

7. The motion picture camera according to claim 6, wherein said arresting means is spring loaded for the engagement with said locking cams and said electromechanical control means is an electromagnet controlled by said primary control means, said electromagnet cooperating with said two-arm lever for disengaging said locking cams.

8. The motion picture camera according to claim 7, further comprising electrical switch means operatively associated with said two-arm lever to turn-on, upon the disengagement thereof from said locking cam means, driving means for said film advancement means.

9. The motion picture camera according to claim 3, wherein said directly driven shutter blade is provided with an opening defined therein, said opening coinciding with said aperture when said shutter means is in said open position thereof, to pass light through said aperture, and said opening being covered by said adjustable shutter blade when said shutter means is in said closed position thereof.

10. The motion picture camera according to claim 9, further comprising spring loaded thrust means coupled to the blades of said rotary shutter to control the angular adjustment of said adjustable blade with respect to said directly driven blade; an adjusting lever disposed at an operative proximity to said thrust means to continuously close and open via said thrust means the resulting exposure sector between said shutter blades and, in addition, to uncover in the extreme swung-up position thereof said opening in said directly driven blade.

11. The motion picture camera according to claim 10, further comprising retractable stop means disposed in the path of movement of said adjusting lever to lock the latter in said extreme swung-up position.

12. The motion picture camera according to claim 11, wherein said retractable stop means is a stop disk connected to a spring-loaded bolt, said bolt projecting through a hole defined in said housing and being terminated with a pull control.

13. The motion picture camera according to claim 11, further comprising motor driven transmission means for controlling the movement of said shutter means on the one hand and the advancement of said film image on the other hand, said transmission means being associated with shutter control means, and said shutter control means being electromagnetically controlled, at the individual picture taking mode of operation, simultaneously with the activation of said primary control means.

14. The motion picture camera according to claim 13, further comprising electrical switch means connected in a power supply circuit for said motor, said switch means being turned on upon disengagement of said shutter control means from said shutter means.

* * * * *